United States Patent [19]
McCausland

[11] Patent Number: 6,109,872
[45] Date of Patent: Aug. 29, 2000

[54] ROTOR BLADE COVER SYSTEM

[76] Inventor: Matthew Angus McCausland, 2829 Chama, NE., Albuquerque, N. Mex. 87110

[21] Appl. No.: 09/270,375

[22] Filed: Mar. 16, 1999

Related U.S. Application Data

[60] Provisional application No. 60/083,654, Apr. 30, 1998.

[51] Int. Cl.$^7$ ................................................. E04H 15/06
[52] U.S. Cl. ............................... 416/62; 416/39; 416/95
[58] Field of Search ................................ 416/62, 95, 39, 416/146 R; 244/191.1, 1 R; 150/166, 167, 154; 135/80.01; 52/2.11, 3, DIG. 14

[56] References Cited

U.S. PATENT DOCUMENTS

| | | | |
|---|---|---|---|
| 4,520,603 | 6/1985 | Brogie | 52/174 |
| 5,179,968 | 1/1993 | Deichmann | 244/1 R |
| 5,765,779 | 6/1998 | Hancock et al. | 244/134 D |
| 5,947,686 | 9/1999 | Keyes | 416/62 |

Primary Examiner—Edward K. Look
Assistant Examiner—Liam McDowell
Attorney, Agent, or Firm—Rod D. Baker

[57] ABSTRACT

A helicopter rotor cover system to prevent ice formation on the rotors. The system is comprised of a main rotor cover and a tail rotor cover providing an enclosed space around the rotors, a tubular member connecting the enclosed spaces of the two covers and a hot air blower to blow hot air into the two covers. The covers and the tubular member are made from a fabric impermeable to water. The covers have adjustable outlet openings to allow flow of heated air to all portions inside the covers. The covers also have grommets for water drainage. For ease of installation and removal, the covers may have separate pieces or openings that are joined with hook-and-loop fabric fasteners. The main rotor blade covers have oval ribs distributed along the rotor blades to reduce the contact area between the blades and the covers and facilitate flow of air. A portable gas tank and a portable battery provide fuel and electricity for the hot air blower.

20 Claims, 4 Drawing Sheets

ROTOR BLADE COVER SYSTEM

CROSS-REFERENCE TO RELATED APPLICATIONS

This application claims the benefit of the filing of U.S. Provisional Patent Application Ser. No. 60/083,654, entitled "Rotor Blade Cover System", filed on Apr. 30, 1998, and the specification thereof is incorporated herein by reference.

BACKGROUND OF THE INVENTION

1. Field of the Invention

This invention relates to aircraft cover systems, particularly covers for rotors or propellers, more particularly a cover system for helicopter rotors.

2. Background Art

Formation of ice on helicopter rotor blades impairs the functionality of the rotors and thus the performance or safety of the helicopter. The rotors must be de-iced before the helicopter may be safely flown. Deicing ordinarily requires the application of chemicals, many types of which may threaten the environment, and which typically flow off the vehicle onto the surface of the ground.

Many helicopters are used in civil defense, law enforcement, or "life flight" ambulance roles, where rapid response time may be important. In emergency situations, such as patient airlifting, rapid helicopter take-off is essential. Deicing is necessary for the safe flight of the helicopter, yet absorbs valuable time when the need for a rapid take-off is imperative.

Currently, in colder climes, helicopter rotors typically are covered with removable tarpaulins which rest directly upon rotor blade surfaces to prevent ice formation. However, the tarps frequently get wet and then freeze to the rotors. Rotor covers frozen to the rotor blades are difficult to remove, and thus may actually be counter-productive when rapid lift-off is demanded. In any event, existing covers commonly provide inadequate protection from ice; due to condensation and leakage, there is inadequate assurance that the blades stay free of ice.

OBJECTS OF THE INVENTION

The objects of this invention include providing a rotor cover system for helicopters that provides sufficient protection against ice formation on rotors, which also can be installed or removed in a short time by one person. While the invention is well-suited for use upon helicopter rotors, it can be adapted for beneficial use upon airplane propellers as well. Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

Broadly characterized, the helicopter rotor cover system according to the present invention is comprised of a main rotor cover and a tail rotor cover, each cover defining an enclosed space around respective rotors, and a tubular member connecting the enclosed spaces defined by the two covers. Optionally, the main rotor cover may be used alone; it is preferable but not critical to the practice of the invention that a tail rotor cover be used in combination with a main rotor cover. The covers and the tubular member are made from a fabric impermeable to water. Preferably, a hot air blower is employed to blow hot air into the two covers, with hot air flowing from one cover to the other via the connecting tubular member.

For each rotor, the associated cover encloses the blades and the exposed parts of the shaft, coupling, or hub of the rotor. The covers have adjustable outlet openings to allow flow of heated air to all portions inside the covers. The covers also have grommets for water drainage.

In one embodiment, the main rotor cover has individual blade covers with open ends at the inner (rotor shaft) end. The blade covers are connected at their open inner ends with VELCRO® bands or other suitable quick-release attachment means. A top cover covers the upper central part of the rotor, and a bottom cover covers the shaft of the main rotor. The bottom cover has a vertical slit or opening, defined by two side edges that are releasably attachable together with VELCRO® bands, which permits the bottom cover to be wrapped around the rotor shaft. The two attachable edges also provide an inlet opening for connection to the hot air blower, whereby hot air may be delivered to the interior of the bottom cover and on into the blade covers. A drawstring around the bottom cover secures the bottom to the main rotor shaft, and allows control of air flow over the main rotor hub. The top and bottom cover are releasably attachable together by VELCRO® bands around their respective peripheral edges. The main rotor blade covers preferably have ribs disposed along their lengths to reduce the contact area between the blade surfaces and the covers, and to promote free flow of air between the blades and the covers.

A portable gas tank and a portable battery preferably provide fuel and electricity for the hot air blower.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

Figure 1:
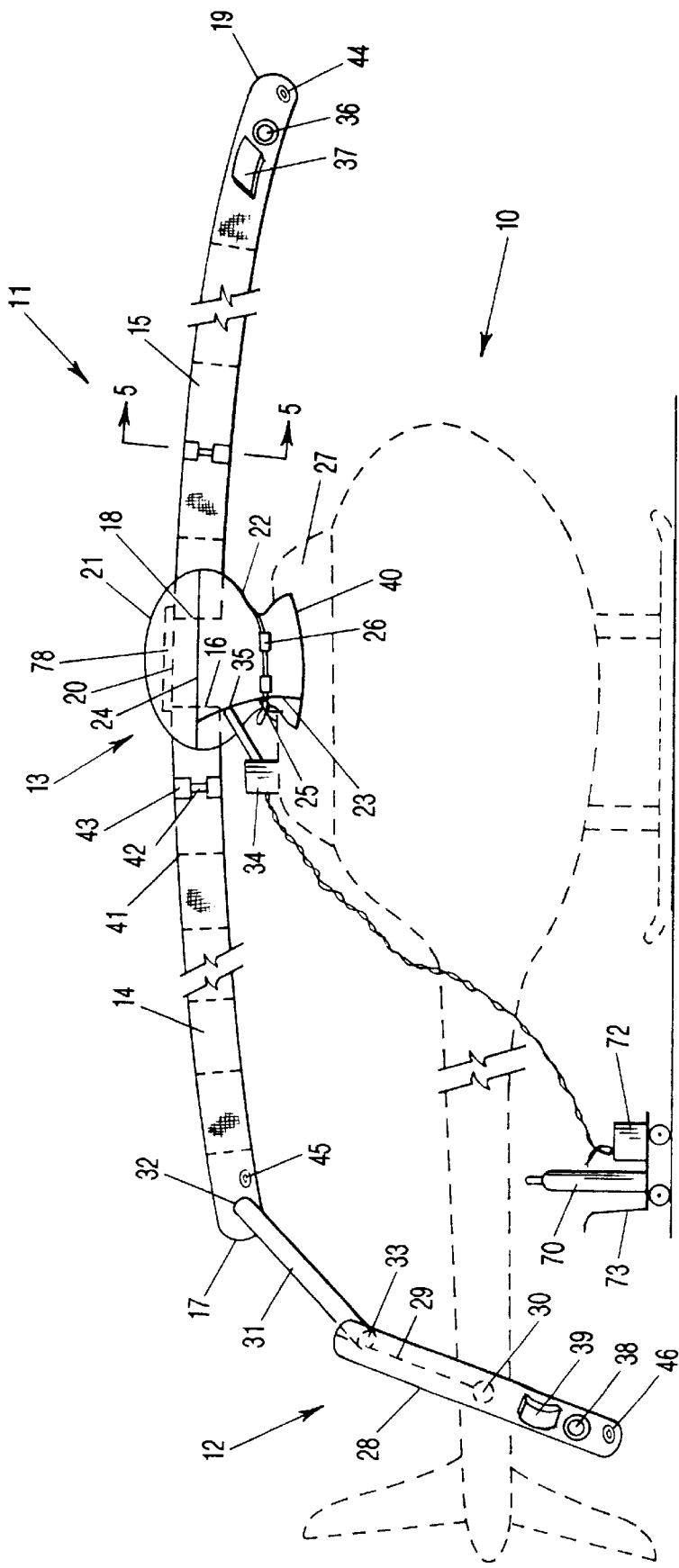
FIG. 1 is a side view of a preferred embodiment of the apparatus of the invention in place for use upon a helicopter.

A preferred embodiment of the invention is depicted generally in FIG. 1. A helicopters has a main rotor 11 and a tail rotor 12. Each rotor has a central shaft, which extends out of a hub, for connecting a plurality (typically but not necessarily two) of rotor blades to the helicopter 10 via conventional couplings, transmission, and the like.

Figure 3:
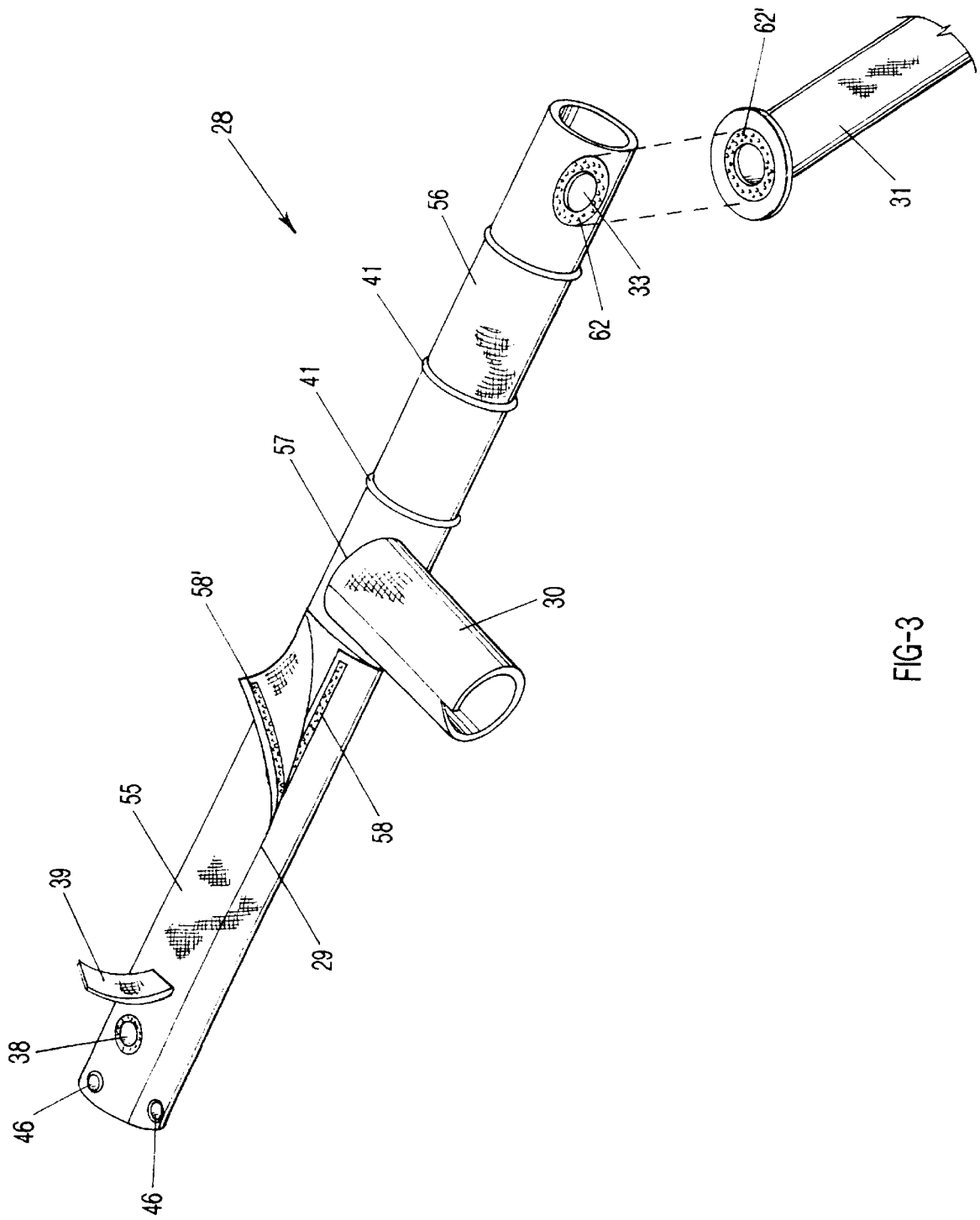
FIG. 3 is an enlarged reverse view of the tail rotor cover portion of the apparatus shown in FIG. 1.

The invention features a main rotor cover 13 and a tail rotor cover 28, which, in the preferred embodiment, are functionally connected by a tubular member 31. The main rotor cover 13 defines and encloses an enclosed space immediately surrounding the main rotor 11. Main rotor cover 13 includes rotor blade covers 14 and 15, and a hub cover portion including a top cover 21 and bottom cover 22. Similarly, the tail rotor cover 28 defines and encloses an enclosed space immediately surrounding the tail rotor 12, and includes tail rotor blade covers 55, 56 (FIG. 3). The invention permits warmed air to be blown into the enclosed spaces around the rotors 11, 12 to reduce or eliminate the formation of ice upon the rotors 11 and 12. Warm air may be conveyed from one of the covers, such as from the main rotor cover 13, to the other rotor cover 28, via the tubular connecting member 31. The covers 13 and 28, and the tubular member 31, are all releasably inter-connectable into the configuration shown in FIG. 1 in a manner to be further described.

Main rotor 11 is enclosed by main rotor cover 13. Cover 13 is comprised of top cover 21, bottom cover 22, and main rotor blade covers 14 and 15 corresponding in number to the number of blades on the main rotor 11. Generally tubular blade cover 14 has an open proximate or inner end 16 and a closed distal or outer end 17. Generally tubular blade cover 15 likewise has an open inner end 18 and a closed outer end 19. Blade covers 14 and 15 preferably are releasably connected together by an intermediate connector 20 such as a cord or strap. The connector strap 20 permits the blade cover 14 to be connected temporarily to blade cover 15 to hold those covers together when in use, but also permits the covers to be detached from each other for removal from the aircraft.

Figure 2:
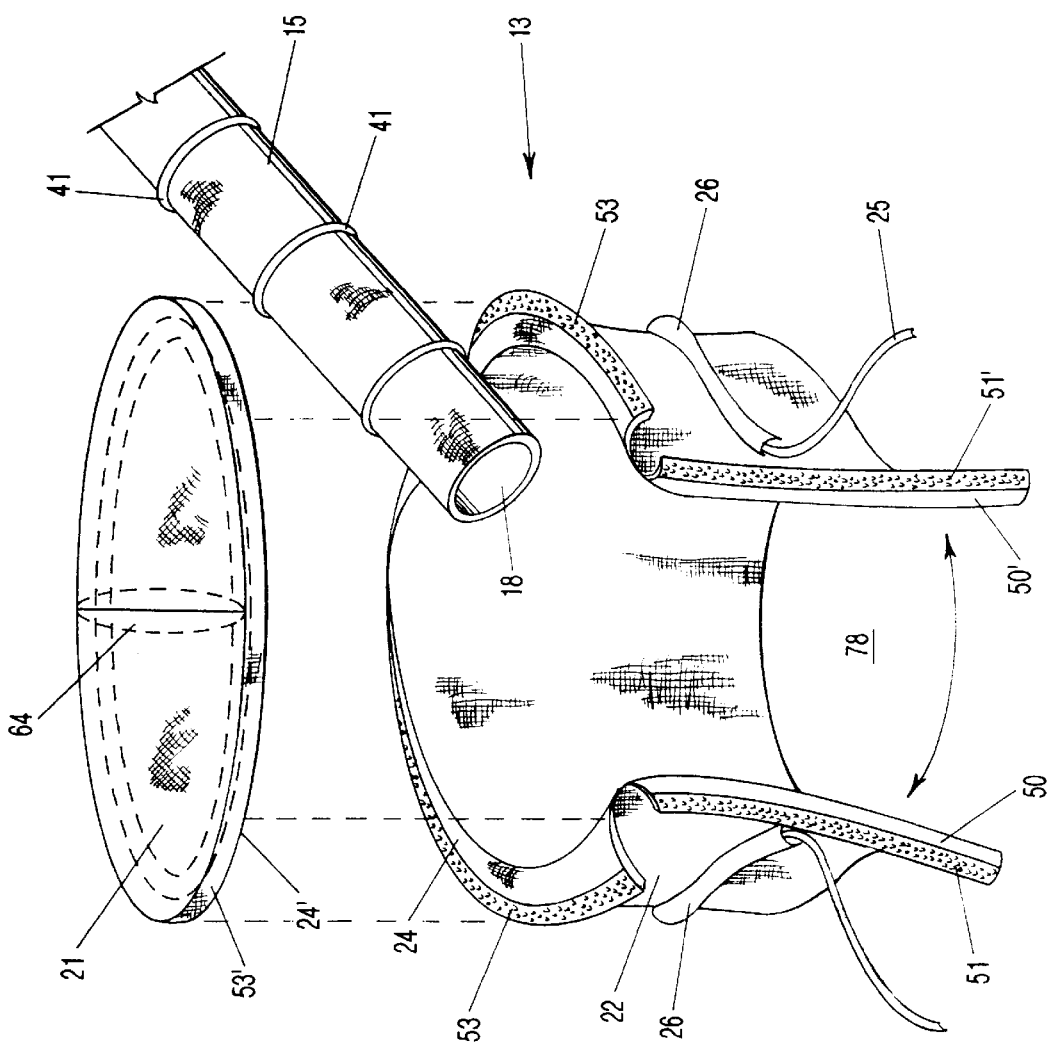
FIG. 2 is an enlarged exploded view of part of the main rotor cover portion of the apparatus shown in FIG. 1.

As suggested by FIGS. 1 and 2, the central portion, including the main rotor shaft, hub, and coupling (not shown), of the main rotor 11 is enclosed by top cover 21 and bottom cover 22 which may be releasably connected together to define and enclose a central enclosed space 78. Bottom cover 22 is constructed so to be wrappable around the main rotor shaft and coupling (not shown). As seen in FIGS. 1 and 2, the bottom cover 22 has a vertical slot 23 defined by two side edges 50, 50' that are releasably attachable to one other to close the slot 23 by any suitable connectors, such as hook-and-loop VELCRO fastener strips 51, 51'. The closing or wrapping action of the bottom cover 22 is indicated by the directional arrows in FIG. 2. Also as best seen in FIG. 2, top cover 21 and bottom cover 22 are releasably attachable to one another, around their respective peripheral edges 24, 24', by suitable connectors, such as VELCRO strips 53, 53'. The connectors 51, 51', 53, and 53' permit the top and bottom covers 21 and 22 to enclose a central space 78 around the central hub portion of the main rotor 11, which space can contain and direct warm air.

The top cover 21, fashioned from water-impermeable fabric or plastic, is in the shape generally of a flexible disk, but may feature a gusset or dart insert 64 to promote adapted installation upon different types of main rotor hubs.

Bottom cover 22 is drawn against the main rotor hub by drawstring 25. Drawstring 25 is held in position by loop channel 26 permanently attached to the bottom cover 22. With the drawstring 25 drawn tight, little clearance remains between bottom cover 22 and the hub of the main rotor 11, as best illustrated in FIG. 1. The lower part of bottom cover 22 near bottom edge 40 then is free to extend or drape over helicopter cowling 27.

The blade covers 14, 15 are arranged to correspond to the spacial arrangement of the rotor blades, and thus when in use extend radially outward from the top and bottom covers 21, 22. FIG. 1 shows how the open inner end, e.g. 18, of either of the blade covers (e.g. 15) is removably inserted into the interior enclosed central space 78 defined within the conjoined top cover 21 and bottom cover 22, by merely placing the inner end 18 between the top cover and the bottom cover prior to bringing the top and bottom covers together; the peripheral edges 24, 24' are then aligned and sealed or connected by the connectors 53, 53' up to both sides of the blade cover 15. The blade cover 15 thus extends radially outward from between the top and bottom covers 21, 22, thereby allowing air to flow from the enclosed volume inside the top and bottom covers radially outward into the blade cover 15. For the sake of clarity of illustration, only one blade cover 15 is shown installed between the conjoined top cover 21 and bottom cover 22. However, as is readily realized by one of ordinary skill in the art, and as seen in FIG. 1, when the invention is in use to deliver warm air to both the blades of the main rotor 11, both blade covers 14 and 15 are disposed into the central covers 21, 22 in the manner shown in FIG. 2. The apparatus so configured, warm air delivered into the central volume 78 enclosed by the top and bottom covers 21, 22, flows into the blade covers 14, 15, (which are disposed around the rotor blades themselves) via the respective open inner ends 16, 18 of the blade covers.

Referring to FIG. 1, a hot air blower 34 preferably is functionally connected to main rotor cover 13 by inserting a conduit from the blower 34 through an opening 35 formed in (mostly closed) vertical slot 23. Blower 34 includes a fan (not shown) powered by battery 72 to blows air via the conduit into the enclosed spaces within the main rotor cover 13 and tail rotor cover 28. Preferably, the blower 34 also includes a heater element, powered by propane source 70, so that blower 34 blows warmed air into the covers 13 and 28 of the invention. Air moves from the main rotor cover 13 to the tail rotor cover 28 by the movement of air through the enclosed space 78 defined within the top and bottom covers 21, 22, through the open inner end 16 of the blade cover 14, along the enclosed space within the blade cover 14, through opening 32 in blade cover 14, through the tubular connecting member 31, and via the opening 33 on into the tail rotor cover 28 where it ultimately may be discharged through the exhaust opening 38 in the tail rotor cover 28. Warmed air also flows from the space enclosed within the top and bottom covers 21, 22, through the open inner end 18 of the other main rotor blade cover 15, and out the exhaust opening 36. Accordingly, air moves around and past the surfaces of the main rotor 11 and tail rotor 12 and prevents formation of ice thereon.

Figure 4:
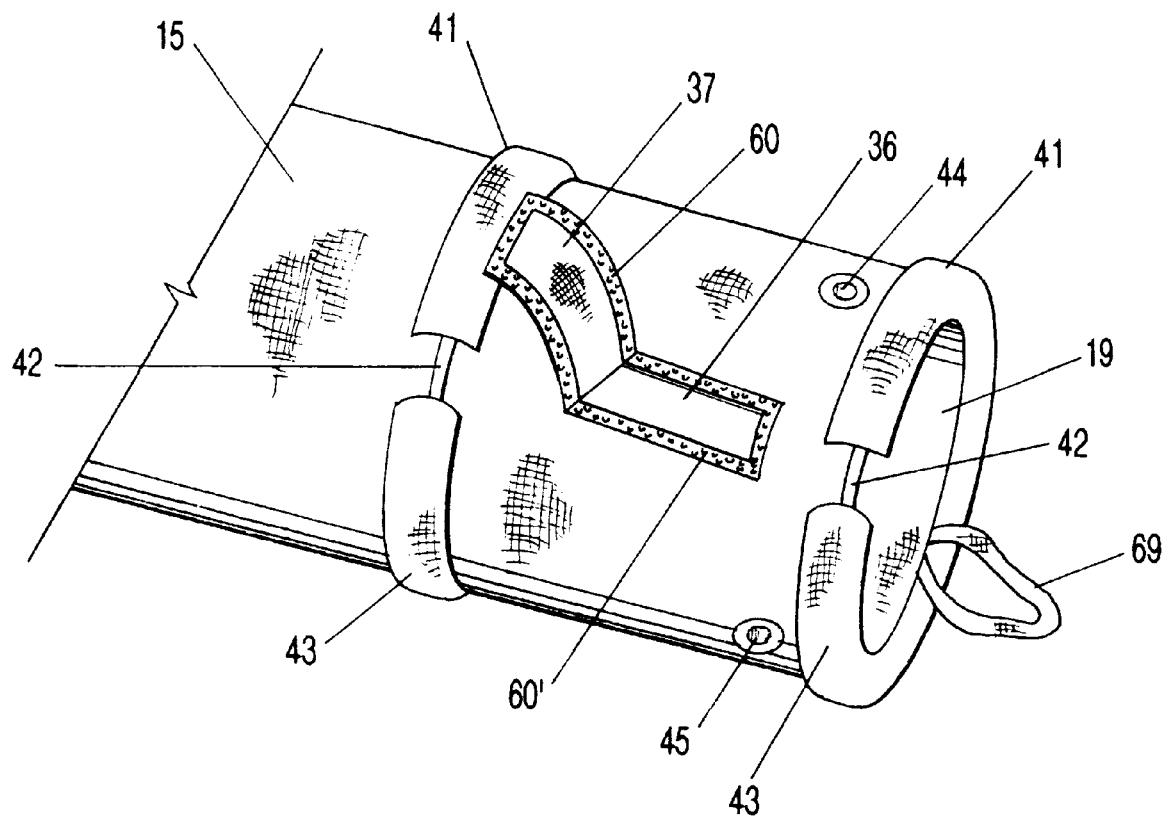
FIG. 4 is an enlarged view of a distal end of a main rotor blade cover portion of the apparatus shown in FIG. 1.

Combined reference is made to FIGS. 1 and 4. As mentioned, part of the heated air also flows from the interior of the central portion of the main rotor cover 13 toward closed outer end 19 of blade cover 15, where it exits through an exhaust opening 36. The size of opening 36 and the amount of flow is adjustable by a flap 37. Flap 37 is flexible and has a hinged connection to the blade cover 15. Flap 37 is selectively positionable, and releasably attachable to the periphery around the opening 36, by the engagement of hook-and-loop VELCRO strip fasteners, or other suitable fasteners 60, 60'. Consequently, the size of the opening 36 is selectively adjustable by modifying the degree of closure of the flap 37 over the opening 36. By adjusting the size of the opening 36, the discharge of air through the main rotor cover 13 can be manipulated and controlled.

Also, referring to FIG. 1, the discharge of air from the main rotor cover 13 can be controlled by use of the drawstring 25. A portion of heated air flows around the main rotor shaft and coupling and over cowling 27 and exits under the bottom edge 40 of bottom cover 22. The flow of air is controlled by adjusting the tightening of drawstring 25.

Attention is invited to FIG. 3, showing the tail rotor cover 28. Tail rotor 12 (FIG. 1) is enclosed by tail rotor cover 28, which has two generally tubular blade covers 55, 56 integrated end-to-end as seen in the figures; (alternative embodiments have tail blade covers corresponding in number to the number of tail rotor blades, if more than two). Tail rotor cover 28 also includes a medially disposed, generally tubular, flexible hub extension 30 which extends approximately perpendicular to the blade covers 55, 56. Extension 30 covers and encloses the tail rotor shaft and hub (not shown). One of the tail rotor blade covers 55 has an access slit 29 to facilitate installation and removal of the cover 28 upon and from the tail rotor 12. As suggested by FIG. 3, access slit 29 extends longitudinally approximately the length of one tail rotor blade. The edges of access slit 29 are attached to each other by any suitable releasable connectors 58, 58' such as VELCRO strips. Tail rotor cover 28 is preferably manufactured from two pieces of flexible waterproof fabric or plastic, one piece constituting the blade covers 55, 56, and the second piece constituting the hub extension 30, joined to the blade covers 55, 56 by an air- and water-tight seam 57.

Combined reference to FIGS. 1 and 3 illustrates that a tubular member 31 connects the enclosed spaces of main rotor cover 13 and tail rotor cover 28 through an opening 32 on main rotor cover 13 and opening 33 on tail rotor cover 28. Tubular member 31 is connected to the covers 13, 28 by any suitable connectors, such as VELCRO strips, which provide for a generally sealed attachment. FIG. 3 illustrates, for example, a pair of annular bands of complementary hook-and-loop fabric fasteners 62, 62' which are employed to releasably join one open end of the tubular member 31 to and about the opening 33 at one end of the blade cover 56 of tail rotor cover 28.

Tail rotor cover 28 also features a warm air exhaust opening 38. The discharge of air through the exhaust 38 is controllable by means of an adjustable flap 39. The degree to which the flap 39 covers the opening 38 determines, in part, the air discharge through the tail rotor 28. A grommet 46 promotes water drainage from the interior of the cover 28. It is noted that the access slit 29 may be in the tail rotor blade cover 56 containing the warm air inlet opening 33 (as depicted in FIG. 1), or alternatively may be provided in the other tail rotor blade cover 55 having the warm air exhaust opening 38 as seen in FIG. 3.

It is seen, therefore, that the openings 36, 38, and the flaps 37, 39, in cooperation with the drawstring 25, serve as a means for regulating the flow of air through the entire system. Air flow to the tail rotor cover 28, for example, can be promoted by selectively decreasing the coverage of exhaust opening 38 by flap 39 while drawing the drawstring 25 tighter to decrease the flow of air from between the bottom cover 22 and the cowling of the aircraft.

As mentioned, air flows through cover 14, tubular member 31 and into tail rotor cover 28. Air exists from the tail rotor cover 28 through the inner open end of hub extension cover 30 (against the hub) and also through opening 38 in tail rotor cover 28. The size of opening 38 and the amount of flow is adjusted by the flexible hinged flap 39, in substantially the same manner as previously described for the flap 37 and opening 36 in the main rotor cover 13. By adjusting the closure of the opening 38 by manipulating the degree to which the flap 39 covers the opening 38, the discharge of air through the tail rotor cover 28 may be controlled.

Figure 5:
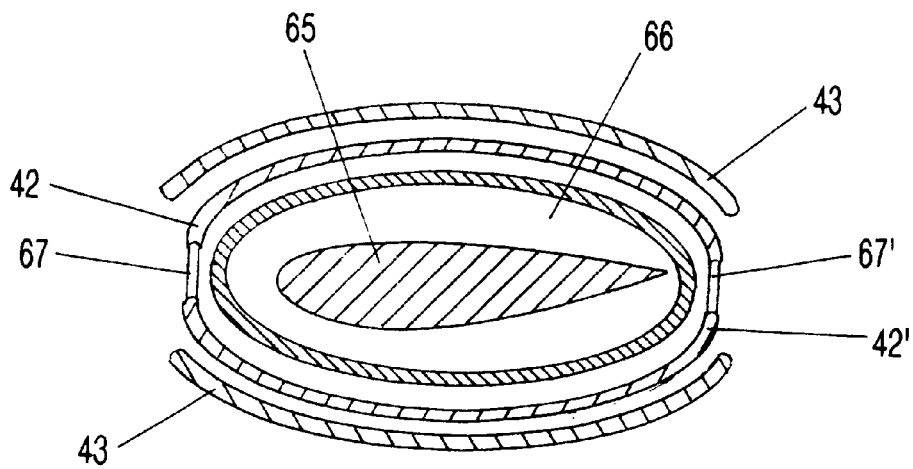
FIG. 5 is a sectional view of a blade cover portion of the invention, taken substantially along section line 5—5 on FIG. 1.

Combined reference is made to FIGS. 1, 4 and particularly 5. Description of a rib 41 in one main rotor blade cover 15 serves to describe other ribs in other covers 14, 55, or 56. A plurality of circular or oval ribs 41 preferably are disposed along the lengths of both the main rotor blade covers 14 and 15. Optionally, ribs 41 may also be provided on one or both tail rotor blade covers 55, 56, although it is preferable that, for convenience of use, ribs not be provided in the tail rotor blade cover 55 having the access slit 29 therein, but rather only in the tail rotor blade cover 56 that defines the air inlet opening 33 therein, as seen in FIG. 3. Ribs 41 have elastically bendable members 42 maintained in position around the covers 14, 15, by loop channels 43. Oval ribs 41 maintain the blade covers 14, 15 in a generally tubular configuration so that the covers stand off each rotor blade 65 (FIG. 5), spaced apart from the surfaces of the rotor blades. Thus, a space 66 is maintained between the rotor blades and the covers 14, 15, to foster air flow around the rotor blades and reduce the contact surface between rotor blades and the covers. The ribs 41 maintain the generally circular or elliptical cross-sectional shape of the covers 14, 15, with the respective rotor blade 65 running generally down the axis of the cover 15 as seen in FIG. 5. Also, oval ribs 41 at open ends 16 and 18 maintain covers 14 and 15 open for air flow.

As indicated in FIG. 5, the ribs 41 may be constructed by bowing a pair of elastically bendable tubes 42, 42' into two opposing arcs, the ends of each tube 42 being brought into proximity with the ends of the corresponding other tube 42' of the pair, and then inserting dowels 67, 67' into the correspondingly paired ends of the tubes 42, 42' thereby to couple the ends together, the bent tubes 42, 42' released to define a circle or oval.

The covers 14, 15 and 28, tubular member 31, loops 26 and 43 and flaps 37 and 40 are preferably made from a fabric impermeable to water. Covers 14, 15 and 28 also have grommets 44, 45 and 46 for water drainage. Although flexible covers are preferred for flexibility and ease of storage, rigid light weight covers may also be used in the system. Handle straps 69 may be fixed to the closed ends 17, 19 of the covers to facilitate their manipulation and removal from the blades.

The attachment means that provide separable attachment for covers 14, 15, and 28, the connecting together of top cover 21 and bottom cover 22, and tubular member 31 to covers 14 and 28, as well as adjustment of openings 36 and 39 are preferably VELCRO brand bands or pads. VELCRO fastener strips provide continuous and essentially air tight attachment with sufficient holding force. However, other alternative fastening means such as rope or strap lacing, zippers, buttons, snaps, or the like may be used as well.

Preferably a portable propane gas tank 70, and a rechargeable battery 72 installed on a dolly 73 provide electricity and fuel for hot air blower 34. The hot air blower 34 is a commercially available item. After removal, the covers may be folded and kept inside a bag attached to the dolly.

The preferred embodiment described here represents the general scope of the invention. Variations including material, number and geometry of covers, hot air supply and methods of manufacturing and attachment fall within the scope of the invention.

I claim:

1. A cover apparatus for reducing ice formation on an aircraft having at least one rotor, the rotor having a hub and least two rotor blades, said cover apparatus comprising a main cover:

a first rotor cover disposable around the rotor; and an air blower in communication with said main cover to blow air into said first rotor cover.

2. The apparatus of claim 1 wherein said air blower comprises a hot air blower to blow heated air into the first rotor cover.

3. The apparatus of claim 1 wherein said first rotor cover comprises:

a bottom cover wrappable around the rotor hub;

a top cover releasably attachable to and above said bottom cover, wherein said top and bottom covers enclose a central space;

blade covers, corresponding in number to the number of rotor blades, each said blade cover extending radially outward from between said top and bottom covers.

4. The apparatus of claim 3 wherein at least one of said blade covers comprises an exhaust opening therein and a flap selectively positionable over said exhaust opening to regulate air flow through said at least one blade cover.

5. The apparatus of claim 3 further comprising at least one drain opening defined in at least one of said blade covers.

6. The apparatus of claim 3 wherein each of said blade covers further comprises a plurality of ribs whereby said blade covers are maintained in a tubular configuration.

7. The apparatus of claim 6 wherein each of said ribs comprises:

a loop channel upon said blade cover; and at least one elastically bendable member, held within said loop channel, bent to define an arc.

8. The apparatus of claim 1 further comprising:

a second rotor cover; and a tubular member releasably connectable between said second rotor cover and said first rotor cover.

9. The apparatus of claim 8 wherein said second rotor cover comprises at least two second blade covers.

10. The apparatus of claim 9 wherein said second rotor cover further comprises a hub extension medially between said second blade covers.

11. The apparatus of claim 9 wherein at least one of said second blade covers comprises an exhaust opening therein and a flap selectively positionable over said exhaust opening to regulate air flow through said at least one second blade cover.

12. The apparatus of claim 9 wherein at least one of said second blade covers further comprises a plurality of ribs whereby said second blade cover is maintained in a tubular configuration.

13. A system for reducing the formation of ice upon the blades of an aircraft rotor or propeller, comprising:

a central hub cover portion defining a central enclosed space;

generally tubular rotor blade covers in communication with said enclosed space and extending radially from said hub cover portion; and means for blowing heated air into said central enclosed space.

14. A system according to claim 13, wherein each said rotor blade cover comprises:

a plurality of ribs for maintaining said blade covers in a tubular configuration;

an exhaust opening; and a flap selectively positionable over said exhaust opening to regulate air flow through said blade cover.

15. A rotor cover system for preventing ice formation on the main rotor and the tail rotor of a helicopter, each rotor having at least two blades, said system comprising:

a main rotor cover comprising:

a central hub cover portion defining an enclosed central space; and at least two main rotor blade covers in communication with said central space and extending radially outward from said hub cover portion;

a tail rotor cover comprising at least two tail rotor blade covers; and a tubular connector member connectable between said main rotor cover and said tail rotor cover.

16. A system according to claim 15, wherein said tubular connector is releasably attachable to one of said main rotor blade covers and to one of said tail rotor blade covers.

17. A system according to claim 16 wherein said hub cover portion comprises a bottom portion wrappable around a rotor hub and a top portion releasably attachable to and above said bottom portion.

18. A system according to claim 17 wherein said main rotor blade covers and at least one of said tail rotor blade covers comprise substantially waterproof material maintained in a generally tubular configuration by a plurality of ribs.

19. A system according to claim 18 further comprising a blower to blow heated air into said enclosed central space.

20. A system according to claim 19 further comprising means for regulating the flow of air through said hub cover portion and said blade covers, said means for regulating comprising:

a drawstring about said bottom cover;

at least one exhaust opening in at least one of said blade covers; and a flap selectively positionable over said exhaust opening.

* * * * *